US007340231B2

(12) United States Patent
Behrens et al.

(10) Patent No.: US 7,340,231 B2

(45) Date of Patent: Mar. 4, 2008

(54) METHOD OF PROGRAMMING A COMMUNICATION DEVICE AND A PROGRAMMABLE COMMUNICATION DEVICE

(75) Inventors: Thomas Behrens, Hellerup (DK); Claus Nielsen, Hellerup (DK); Thomas Lunner, Hellerup (DK); Claus Elberling, Hellerup (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 10/491,332

(22) PCT Filed: Sep. 20, 2002

(86) PCT No.: PCT/DK02/00609

§ 371 (c)(1),
(2), (4) Date: Apr. 23, 2004

(87) PCT Pub. No.: WO03/032681

PCT Pub. Date: Apr. 17, 2003

(65) Prior Publication Data

US 2004/0208326 A1 Oct. 21, 2004

(30) Foreign Application Priority Data

Oct. 5, 2001 (DK) .............................. 2001 01461

(51) Int. Cl.
*H04B 1/18* (2006.01)
*H04R 29/00* (2006.01)

(52) U.S. Cl. ..................................... 455/173.1; 381/92

(58) Field of Classification Search .................. 381/92, 381/95, 122, 56, 312, 58, 60, 68.2, 68.4, 381/23.1, 314, 317, 320; 434/307 A, 308–318, 434/319; 84/477 R, 600, 609–610, 634; 704/209, 261; 73/585; 600/559; 455/92, 455/95, 58, 60, 312, 68.2, 68.4, 23.1, 314, 455/317, 320, 177.1, 355, 200.1, 219, 340, 455/68, 23
See application file for complete search history.

(56) References Cited

U.S. PATENT DOCUMENTS 4,241,235 A 12/1980 Mccanney
4,915,001 A * 4/1990 Dillard ........................ 84/600

(Continued)

FOREIGN PATENT DOCUMENTS

EP 0241101 10/1987

(Continued)

*Primary Examiner*—Naghmeh Mehrpour
(74) *Attorney, Agent, or Firm*—Dykema Gossett PLLC

(57) ABSTRACT

In the method according to the invention the communication device has a microphone and a signal path leading from the microphone to a speaker, where the signal path comprises a programmable signal processing unit. According to the method the user is given control in a training session over one or more signal processing parameters within the signal processing unit. In the training session the user listens to the sound of his or her own voice transmitted through the communication device, and adjusts the one or more signal processing parameters until he or she is satisfied with the sound quality of his/her own voice. The values of the signal processing parameters chosen by the user during the training session are stored in a storing means within the device, and the programmable signal processing automatically uses the stored parameter when detection means within the unit detects the users own voice.

8 Claims, 4 Drawing Sheets

U.S. PATENT DOCUMENTS

| | | | | | |
|---|---|---|---|---|---|
| 4,975,967 | A | | 12/1990 | Rasmussen | |
| 5,197,332 | A | | 3/1993 | Shennib | |
| 5,447,438 | A | * | 9/1995 | Watanabe et al. | 434/307 A |
| 5,477,003 | A | * | 12/1995 | Muraki et al. | 434/307 A |
| 5,577,511 | A | | 11/1996 | Killion | |
| 5,729,694 | A | * | 3/1998 | Holzrichter et al. | 705/17 |
| 5,765,134 | A | | 6/1998 | Kehoe | |
| 5,794,203 | A | | 8/1998 | Kehoe | |
| 5,812,659 | A | | 9/1998 | Mauney et al. | |
| 5,906,494 | A | * | 5/1999 | Ogawa et al. | 434/307 A |
| 6,118,877 | A | * | 9/2000 | Lindemann et al. | 381/60 |
| 6,228,057 | B1 | | 5/2001 | Vasko | |
| 2002/0068986 | A1 | * | 6/2002 | Mouline | 700/94 |
| 2003/0033145 | A1 | * | 2/2003 | Petrushin | 704/236 |
| 2004/0083100 | A1 | * | 4/2004 | Burnett et al. | 704/233 |
| 2004/0194610 | A1 | * | 10/2004 | Davis | 84/466 |

FOREIGN PATENT DOCUMENTS

| | | |
|---|---|---|
| WO | 0217835 | 3/2002 |

* cited by examiner

METHOD OF PROGRAMMING A COMMUNICATION DEVICE AND A PROGRAMMABLE COMMUNICATION DEVICE

AREA OF THE INVENTION

The invention concerns a method of programming a communication device, and to a programmable communication device which includes a microphone and a signal path leading from the microphone to a loudspeaker, the signal path including a programmable signal processing unit.

THE PRIOR ART

In programmable communication devices like hearing aids or headsets it is known to provide a program for controlling the signal processing unit. The program adapts the processing to the actual sound environment in which the communication device is situated. It is also known to provide detection means in the communication device to detect the user's own voice, so that the program may control the signal processing unit to take account of the user's own voice.

From publication JP 11331990 A an uttered detector, a voice input device and a hearing aid is known, in which an external environment and an external auditory meatus are cut off and a signal received at the external environment is delayed by a prescribed time and outputted from a receiver of the external auditory meatus. The external auditory meatus is provided with a microphone, which picks up a signal outputted from the receiver and a voice signal that is uttered by a wearing person and propagated internally. The external voice signal component is cancelled by subtracting the signal component picked up by the microphone out of the signal received by the microphone so as to detect and extract only one's own uttered voice component.

From publication No. 09-163499 [JP 9163499 A] a hearing aid with speaking speed changing function is known the shape change of the external auditory meatus is detected from the change amount of detection output from a distortion sensor provided at the section of adapter to be inserted into the external auditory meatus and an uttering action detection part identifies whether the voice signal fetched by a microphone is the voice uttered by the user or not from this detection output. When it is identified as the voice uttered by the user of the hearing aid, the working of speaking speed-changing processing is inhibited to a signal processing part. Then, the signal processing part works the voice signal fetched by the microphone, and the voice signal is converted to air vibrations by a receiver and emitted to the external auditory meatus of the user.

In these prior art documents the user's perception of his or her own voice is not treated in detail, and no method is described which ensures a natural sound of the user's voice. In this context the concept of natural is defined by user preference.

The object of the invention is to provide a communication device and a method which provides the user with the possibility of controlling the programming of the signal processing so as to improve the sound quality of his or her own voice according to his or her individual preference.

SUMMARY OF THE INVENTION

In the method according to the invention the communication device has a microphone and a signal path leading from the microphone to a speaker, where the signal path comprises a programmable signal processing unit. According to the method the user is given control in a training session over one or more signal processing parameters within the signal processing unit. In the training session the user listens to the sound of his or her own voice transmitted through the communication device, and adjusts one or more signal processing parameters until he or she is satisfied with the sound quality of his/her own voice. The values of the signal processing parameters chosen by the user during the training session are stored in a storing means within the device, and the programmable signal processing automatically uses the stored parameter when detection means within the unit detects the user's own voice.

Use of the method will provide the user with the opportunity to adjust the processing parameters to his own liking, so that his voice sounds as natural to him as possible. Having performed the training session, the user will have a device which whenever he or she speaks will reproduce the sound of the voice using a special set of processing parameters, namely the ones chosen by the user during the training session.

In a preferred embodiment of the method the signal processing parameters which are controlled by the user during the training session include one or more of the following: overall level, spectral shape, time constants of the level detectors or combinations thereof.

In a further possible embodiment, the detection means comprises a further input channel which is connected to detection means in order to detect when the user's own voice is active. Such a further input channel could be a detector placed deeper in the ear canal, which is capable of detecting movement or sound transmitted through the tissue/bone of the user of the device.

A further input channel and a detection means would make an apparatus for implementation of the method expensive. Therefore, in an alternative embodiment, the user's own voice is detected by use of a means for generating and storing a first set of descriptive parameters of the signal from the microphone during user vocalization. This is combined with means for generating a further set of descriptive parameters during normal use of the communication device. A means for comparing the further set of descriptive parameters with the first set of stored descriptive parameters is used in order to device whether the signal from the microphone comprises sounds originating from the user's voice.

Preferably the descriptive parameters comprises the energy content of low and high frequency bands. But they could also be overall level, pitch, spectral shape, spectral comparison of auto-correlation and auto-correlation of predictor coefficients, cepstral coefficients, prosodic features, modulation metrics or activity on the other input channel, for instance from vibration in the ear canal, caused by vocal activity. That such descriptive features can be used to identify, e.g., voice utterances, is known from speaker verification, speech recognition systems and the like.

The communication device according to the invention comprises a microphone and a signal path leading from the microphone to a speaker. The signal path comprises a programmable signal processing unit whereby the communication device further comprises:

- detection means associated with the signal path for detecting when the signal in the signal path contains sounds originating from the user's voice;
- means for storing at least one user chosen parameter set of the program for controlling the processing unit, means for applying the user chosen parameter set for the program for controlling the signal processing unit, when sounds originating from the user's voice are detected.

The basic idea is to let the user of a communication device, such as a hearing aid or a head set, design the signal processing of the device to his/her preference, when speaking, singing, shouting, yawning and the like. The user is given a handle in software or hardware, which is designed to change the signal processing of the hearing aid in a specific manner during vocalization. The user then adjusts the signal processing until he or she is satisfied with the sound quality of his/her own voice. The adjustment of the signal processing results in a parameter set, which is stored. The stored parameter set is used automatically by the program when the detection means detects the user's own voice. Thereby the user's own voice will sound as the user prefers it to.

In order to distinguish the user's own voice from other sound environments or voices some sort of "own voice detection" must be applied.

According o the invention, the communication device has detection means for detecting when the signal in the signal path contains sounds originating from the user's voice. The detection means comprises means for generating and storing a first set of descriptive parameters of the signal from the microphone during user vocalization and means for generating a further set of descriptive parameters during normal use of the communication device. Further, the communication device has means for comparing the further set of descriptive parameters with the first set of stored descriptive parameters in order to decide whether the signal from the microphone comprises sounds originating from the user's voice.

Thus the communication device will be able to apply the correct user-designed signal processing to the user's own voice, when it is detected.

For the own voice detection to distinguish between the user's own voice, other voices or other sounds, the descriptive parameters of the user's voice must be recorded. These descriptive parameters of the voice can either be recorded while user adjusts the signal processing of the communication device, before adjusting or after adjusting.

Preferably the user adjusts the frequency response and gain of a digital filter when he or she speaks until the sound quality of own voice is satisfactory. After the adjustment, the user speaks for a while, while the communication device records descriptive parameters of the voice. The descriptive parameters of the voice are used to recognize the user's own voice, so that the preferred signal processing of the apparatus can be activated upon recognition.

By the use of the invention the signal processing of a head set for communication purposes, or a hearing aid can be designed in a specific manner by the user, when he or she speaks, shouts, sings or the like.

A method for attenuation of annoying artifacts when the user chews, coughs, swallows or the like can be implemented in a manner similar to the method described above. Instead of one's own voice detection, detection, of e.g., chewing will be applied.

DESCRIPTION OF A PREFERRED EMBODIMENT

Figure 1:
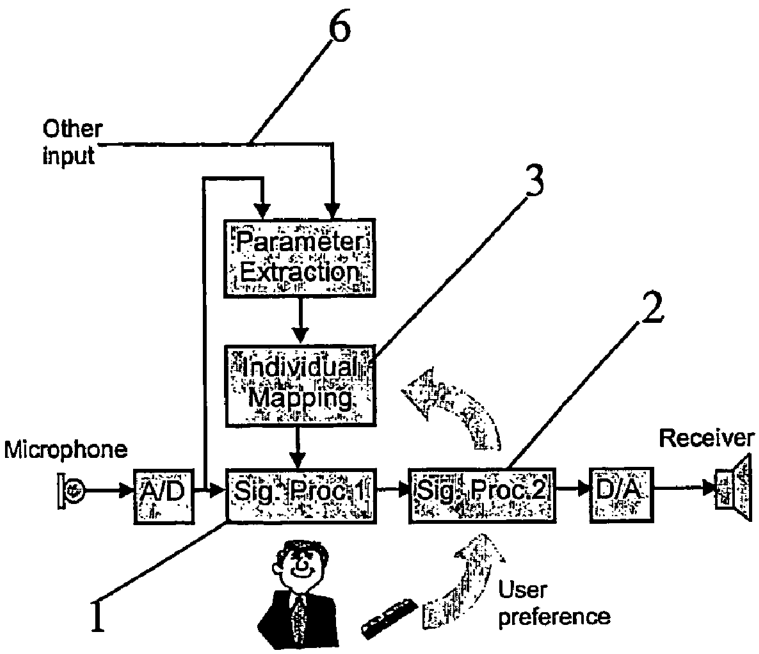
FIG. 1 is a schematic representation of a hearing aid according to the invention, when being subjected to user preference.
Figure 2:
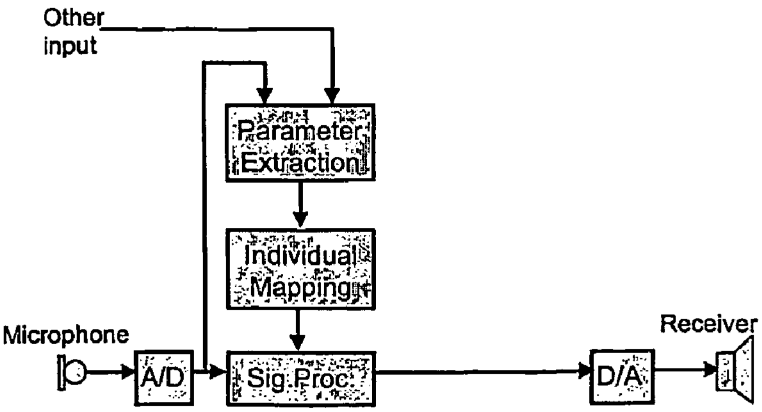
FIG. 2 is a schematic representation of a preferred embodiment of the invention when the hearing aid is in use.

In FIG. 1 it is shown how the user in a training phase adjusts the sound quality of his/her own voice. The user is given control of the signal processing unit 2, and can adjust the parameters of the signal processing, and thereby change the sound of his/her own voice as it is presented through the hearing aid. The signal processing which takes place in signal processing unit 2 is added to the signal processing which takes place in signal processing unit 1. During the training phase a signal processing unit 2 in FIG. 1, which is a copy of the one attached to the individual mapping 3, is used for this purpose. The individual mapping is the program controlling how the signal processing unit 1 changes characteristics as the descriptive parameters changes. Thus, the user is able to add or subtract the same type of signal processing which is carried out by the first signal processing unit 1 in FIG. 1. So if the signal processing of signal processing unit 1 is a simple FIR filter, then also signal processing unit 2 will be a FIR filter. The combined parametric setting of signal processing units 1 and 2 when the user is satisfied with the sound quality of his/her own voice is used as the preferred setting. The individual mapping will after being adapted to the preferred setting reproduce the chosen parametric setting in the signal processing unit 1 whenever own voice is detected. This is shown in FIG. 2.

For the own voice to be detected the parameter extraction must extract descriptive parameters of the input signal. These could be overall level, pitch, spectral shape, spectral comparison of auto-correlation and auto-correlation of predictor coefficients, cepstral coefficients, prosodic features, modulation metrics or activity on the other input channel 6, for instance from vibration in the ear canal, caused by vocal activity. That such descriptive features can be used to identify e.g. voice utterances is known from speaker verification, speech recognition systems and the like.

Figure 5:
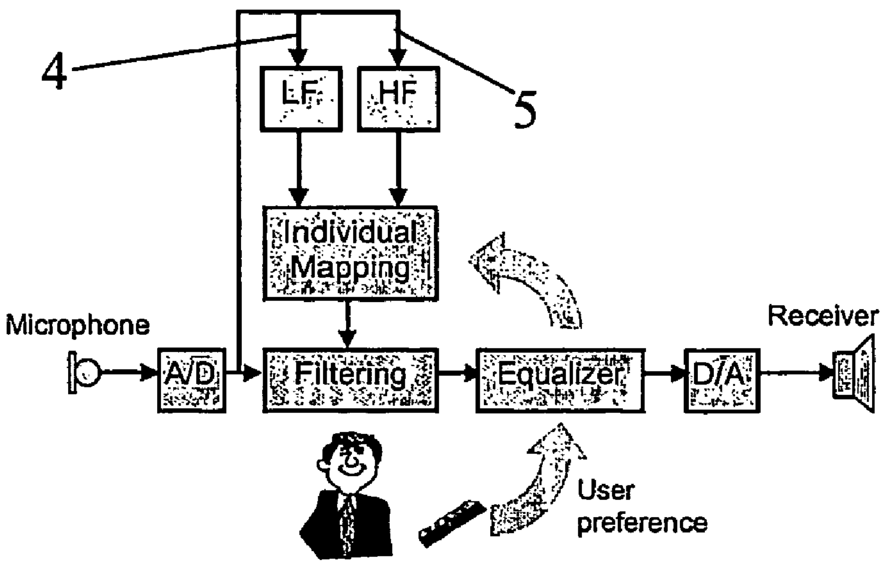
FIG. 5 is a schematic representation of an embodiment of the invention, when being subjected to user preference.
Figure 6:
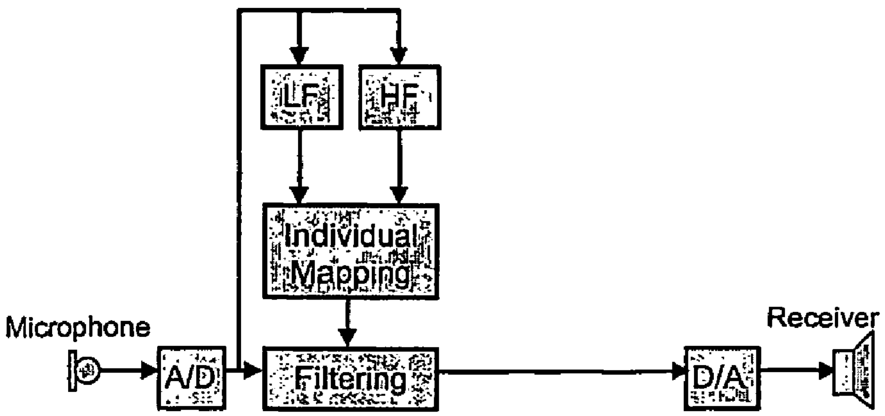
FIG. 6 is a schematic representation of a preferred embodiment of the invention when the hearing aid is in use.

In a preferred embodiment the parameter extraction consists simply of the energy content of low and high frequency bands, for instance with a split frequency of 1500 Hz. The hearing aid structure of the preferred embodiment is shown in FIGS. 5 and 6. Here the parameters which are extracted are simply the energy contents of the low and high frequency bands 4, 5.

Figure 7:
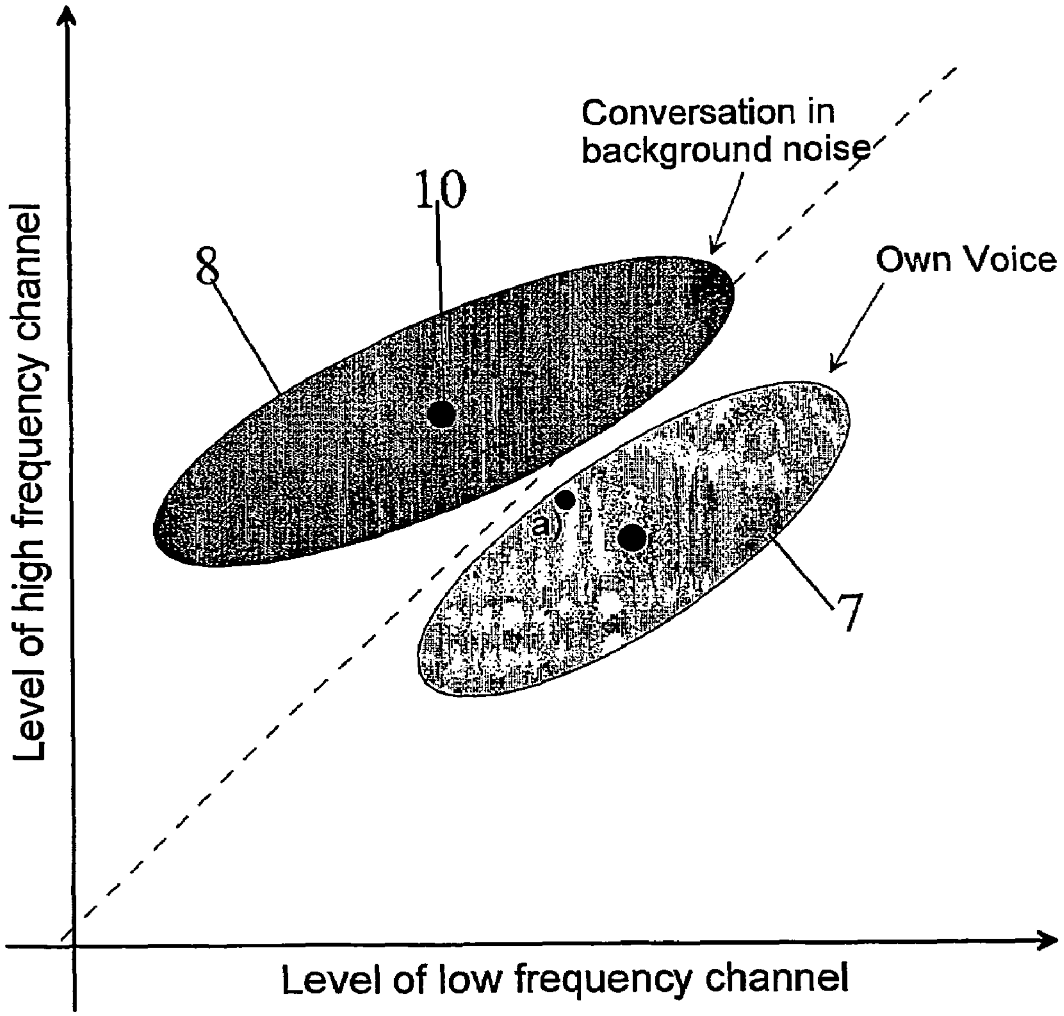
FIG. 7 is an illustration of the energy content of the low and high frequency channels in different listening situations.

That the own voice can be recognized, for instance against a dialogue in background noise can be illustrated by means of the illustration shown in FIG. 7. As the figure shows, the balance in energy between low and high frequency content is different for the two environments. The own voice, which is illustrated by the light gray area 7 is more dominated by low frequency energy than the dialogue. This is due to the low frequency coloration that takes place when the voice travels from the mouth to the hearing aid microphone location.

When the parameter extraction presents parameters of an input signal matching those of own voice, the individual mapping will apply the preferred signal processing of own voice, as designed by the user during the training phase. A sound environment characterized by low and high frequency energy content can be represented by one of the oval areas 7,8 shown on FIG. 7. Thus when the low and high frequency content of a sound environment matches that of the center of gravity of one of the environments shown in the figure, the filter in FIG. 6 will present exactly the preference indicated by the user during the training phase.

The training phase may include the sounds having a combination of own voice and noise, and the user may during this chose what the signal processing should be like. When the preferred sound of own voice is chosen, the noise or conversation in the background may become more or less dominant. This is a matter of the users personal choice. If the energy content of a sound environment corresponds to points inside the light gray oval 7, for instance at point a) in FIG. 7, the filter characteristic will be dominated by the preference expressed by the user for own voice. But it will also to some extend be influenced by the preference expressed on the dialogue in a noisy environment, since this environment is close to point a).

Figure 3:
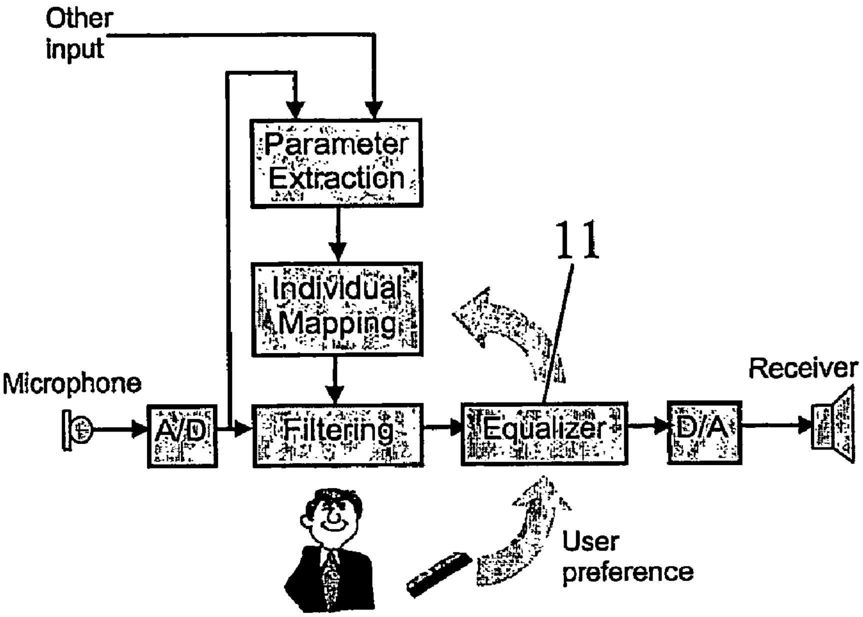
FIG. 3 is schematic representation of a hearing aid according to the invention, when being subjected to user preference.

In FIG. 3 it is shown how the user in a training phase adjusts the sound quality of his/her own voice by being given control of an equalizer 11. The parametric setting of the equalizer 11 when the user is satisfied with the sound quality of his/her own voice is used as the preferred setting, and the individual mapping will reproduce it in the filter whenever own voice is detected.

Figure 4:
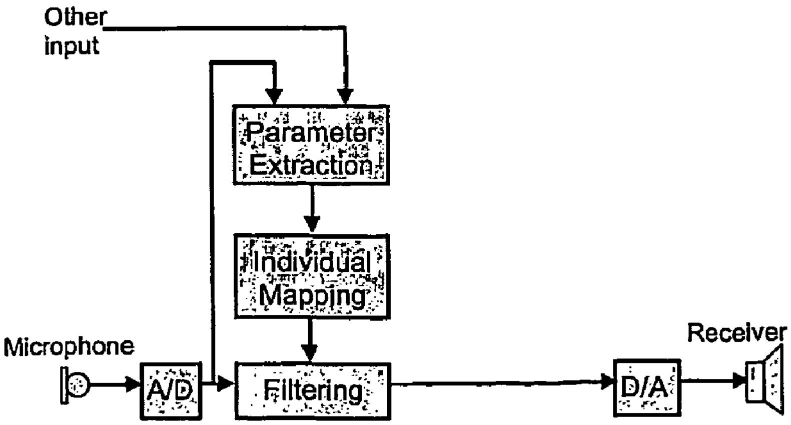
FIG. 4 is a schematic representation of a preferred embodiment of the invention when the hearing aid is in use.

When the parameter extraction presents parameters of an input signal matching those of own voice, the individual mapping will apply the preferred filtering of own voice, as designed by the user during the training phase. This is shown in FIG. 4.

The invention claimed is:

1. A method of programming a communication device which includes a microphone, a speaker and a signal path that extends from the microphone to the speaker and which includes a programmable signal processing unit, said method comprising the steps of:

a. conducting a training session wherein a user listens to his or her own voice through the communication device and adjusts at least one signal processing parameter of the programmable signal processing unit so that the sound quality of his or her voice is deemed satisfactory, and b. storing a value of each signal processing parameter obtained in step (a) in a storing means for automatic use when the programmable signal processing unit detects the user's voice passing through the signal path.

2. Method as claimed in claim 1, wherein the signal processing parameters, which are controlled by the user during the training session, comprise one or more of the following: overall level, pitch, spectral shape, spectral comparison of auto correlation and auto-correlation of predictor coefficients, spectral coefficients, prosodic features and modulation metrics.

3. Method as claimed in claim 1, including an input channel which is connected to detection means in order to detect when the user's own voice is active.

4. Method as claimed in claim 1, wherein the detection of the user's own voice is accomplished by use of a means for generating and storing a first set of descriptive parameters of the signal from the microphone during user vocalization and means for generating a further set of descriptive parameters during normal use of the communication device and use of a means for comparing the further set of descriptive parameters with the first set of stored descriptive parameter in order to decide whether the signal from the microphone comprises sounds originating from the user's voice.

5. Method as claimed in claim 4, wherein the descriptive parameters comprises the energy content of low and high frequency bands.

6. Communication and listening device for use in the method according to claim 1 with a microphone and a signal path leading from the microphone to a speaker, where the signal path comprises a programmable signal processing unit whereby the communication device further comprises:

detection means associated with the signal path for detecting when a signal in the signal path contains sounds originating from the user's voice;

means for storing at least one user-chosen parameter set of the program for controlling the processing unit, and means for applying the user-chosen parameter set for the program for controlling the signal processing unit when sounds originating from the user's voice are detected.

7. Communication and listening device as claimed in claim 6, wherein the detection means for detecting when the signal in the signal path contains signals originating from the user's voice comprises:

means for generating and storing a first set of descriptive parameters of the signal from the microphone during user vocalization;

means for generating a further set of descriptive parameters during normal use of the communication device; and means for comparing the further set of descriptive parameters with the first set of stored descriptive parameters in order to decide whether the signal from the microphone comprises sounds originating from the user's voice.

8. Communication and listening device as claimed in claim 6, wherein the descriptive parameters comprise one or more of the following: overall level, pitch, spectral shape, spectral comparison of auto-correlation and auto-correlation of predictor coefficients, prosodic features, modulation metrics and activity on a further input channel caused by vocal activity.

* * * * *